LOGICAL MAGNETOSTATIC ELEMENT WITH MIXED INPUT

Filed Dec. 21, 1966

3,504,190
LOGICAL MAGNETOSTATIC ELEMENT WITH MIXED INPUT

Michel Arnoux, Verrieres-le-Buisson, France, assignor to C.I.T.—Compagnie Industrielle des Telecommunications, Paris, France
Filed Dec. 21, 1966, Ser. No. 603,675
Claims priority, application France, Dec. 24, 1965, 43,713
Int. Cl. H01f 27/42
U.S. Cl. 307—88 13 Claims

ABSTRACT OF THE DISCLOSURE

This disclosure provides a magnetic amplifier connected to the control electrode of a transistor through a pair of serially connected diodes with separate control lines also being connected to the control electrode of said transistor so that said transistor can be controlled either from said magnetic amplifier or from said separate control lines, due to the isolation between the control functions provided by the diodes.

A magnetostatic relay in which a magnetic amplifier is connected in control of a transistor is already known from U.S. Patent 2,946,896. The magnetic amplifier comprises, a core made from magnetic material having a rectangular hysteresis characteristic, a working winding on said core through which alternating current flows, and various control windings on said core through which direct current flows. The output current of the amplifier depends upon the algebraic sum of the controlling ampere turns produced by the working winding and control windings thereof. When this current exceeds a certain reference value, the transistor is blocked; whereas, the transistor is conducting if the current is maintained below the reference value. A filter condenser is placed in shunt with the base bias resistor of the transistor so that the current which is carried by the collector is direct and constant when the transistor is conducting, but this current wil be zero when the transistor is blocked.

In summation, according to the value of the controlling ampere turns, the relay will assume either one or the other of two stable conditions and will deliver either a direct and constant output current or a zero output current.

One drawback of the relay described above resides in the relatively significant starting and cut-off time thereof (which is in the order of a tenth of a millisecond) and which does not make it possible to use it in devices requiring rapid switching. On the other hand, such a relay does make it possible to detect currents which have a very weak level and circulate in electrically insulated circuits without, however, disturbing the state of these circuits, which is not possible by means of conventional electronic systems.

Thus, by way of example, the magnetostatic relay may be utilized as a telephone calling relay if one of the control windings thereof is inserted into the subscriber line; in such an environment the relay is energized in less than one millisecond when the subscriber is calling, without producing a perceptible interference in the condition of the circuit prior to and after actuation. It does not, however, have the power to respond to an inquiry device of the calling subscriber if this device proceeds at great velocity by means of sample pulses produced at the rate of an interval of about twenty micro-seconds per subscriber, for example.

The object of the present invention is precisely that of causing the incompatibility between these two usages to disappear by an adaptation of the magnetostatic relay.

In accordance with the present invention, the adaptation of the magnetostatic relay, in addition to its usual role of detector of weak current in an electrically insulated circuit, makes it possible to obtain a double goal, i.e., (1) it renders possible the utilization thereof in devices with rapid switching, and (2) it renders possible an increase of the amplitude of the output current during a short instant.

The element as proposed by the present invention is remarkable particularly by reason of the fact that it comprises a saturable magnetic core provided with direct current control windings and one alternating current working winding. The output of the magnetic core is made through the working winding and an output diode, a transistor being connected to the output diode through a second diode oriented in the same sense as the output diode of the magnetic core, and control pulses are applied to the control electrode of the transistor in such a manner that the transistor can be controlled either by a command originating from the magnetic core, or by a command origating from the control pulses.

According to one characteristic, the state of saturation or nonsaturation of the transistor is a function not only of the control currents being received by the magnetic amplifier, but also of the sample pulses.

According to another characteristic of the present invention, the base of the transistor is connected to three circuit branches in parallel, namely a first branch constituted by a resistance whose extremity is connected to a fixed negative polarity, a second branch constituted by the control wire receiving the sample pulses, and a third branch constituted by a device either assuring or not assuring the continuity between the magnetic amplifier and the base of the transistor.

According to yet another characteristic of the present invention, the device being interposed in the third branch between the output diode of the amplifier and the base of the transistor comprises a second diode in series with the output diode of the amplifier and oriented as the former, the point common to the two diodes being also connected, on the one hand, to the negative polarity through a resistance, and, on the other hand, to ground through a condenser.

According to a further characteristic of the present invention, the element will behave like a normal magnetostatic relay in the absence of command on the input control line.

Additional characteristics of the present invention will become apparent from the following description and in conjunction with the drawing showing one embodiment of a device in accordance with the present invention, and it is understood that the particularities which are evident from the text as well as from the drawing constitute part of the present invention.

In the drawing, and giving exclusively by way of non-limiting example:

Figure 1:
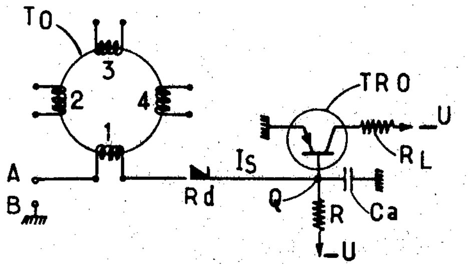
FIGURE 1 shows a diagram of a magnetostatic relay of the known type.

In FIGURE 1, the magnetostatic relay comprises a core $T_0$ made from saturable magnetic material upon which several windings 1, 2, 3, 4, etc., are wound. The winding 1 being supplied with alternating current is connected to the base of a transistor $TR_0$ through a diode $R_d$ which allows only for the passage of the positive half of an alternating waveform. The windings 2, 3 and 4 are traversed by direct currents and the algebraic sum of the ampere turns thereof forms the controlling ampere turns in the magnetic circuit. The base of the transistor $TR_0$ of the PNP type is connected to the negative polarity side of a direct current source U through a resistance R and to ground through a condenser $Ca$. If $I_S$ is the output current of the magnetic amplifier supplied to the base of transistor $TR_0$ the potential at the point Q at the base of the transistor is:

$$V_Q = -U + RI_S$$

This potential is positive or negative, depending upon whether $RI_S$ is greater or smaller than U in absolute value; thus, if $I_S$ is strong, the potential of point Q tends to become positive; If $I_S$ is weak, the potential of point Q tends to become negative; whereas, the potential is zero for $I_S = U/R$. The filter condenser $Ca$ makes it possible to obtain a direct current at the collector of $TR_0$.

In the utilization of this relay, it is possible either to make use only of a single control winding, for example winding 2, which is then inserted in series into the circuit where a weak current must be detected, or to make use of several windings 2, 3 and 4 each being inserted in series into a particular circuit, and it is then the algebraic sum of the ampere turns due to the different windings which has to be taken into consideration.

Figure 2:
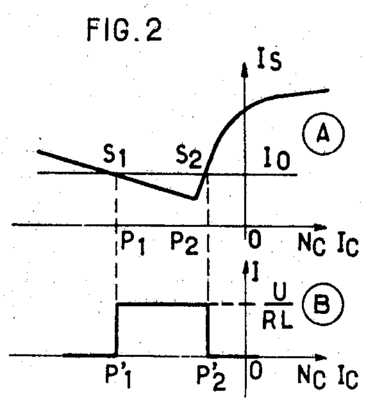
FIGURE 2 shows characteristic curves of the relay according to FIGURE 1.

Waveform A in FIGURE 2 represents the characteristic of the output current $I_S$ of the magnetic amplifier in FIGURE 1 as a function of the algebraic sum of the controlling ampere turns $N_C I_C$. For a value of $I_S$ equal to $I_0 = U/R$, two points $S_1$ and $S_2$ exist on the characteristic.

Between $S_1$ and $S_2$, the current $I_S$ is smaller than $I_0$; thus the potential of point Q at the base of transistor $TR_0$ is negative for these values of $I_S$. At the outside of $S_1$ or of $S_2$, the current $I_S$ is greater than $I_0$ and point Q at the base of transistor $TR_0$ has a positive potential. The transistor $TR_0$ being of the PNP type, when the point Q is negative the transistor is conducting and when the point Q is positive the transistor is blocked.

Waveform B of FIGURE 2 represents the characteristic of the output current I at the collector of the transistor $TR_0$ as a function of the algebraic sum of the controlling ampere turns $N_C I_C$. It is apparent that the current I asumes the constant value $U/R_L$ when the transistor is conducting between points $P_1'$ and $P_2'$ corresponding to $S_1$ and $S_2$, and the current I assumes the value zero outside of points $P_1'$ or of $P_2'$. It should be noted that in FIGURE 1, when the transistor passes from the blocked condition into the conducting state, the potential of point Q passes from a positive value to a negative value. The charge of the condenser has thus changed direction after being nulled. During the discharge of the condenser from the positive value to the value zero, point Q has kept its positive potential which has thus delayed by a short period of time equal to the discharge time of the condenser $Ca$ the change in condition of the transistor.

Figure 3:
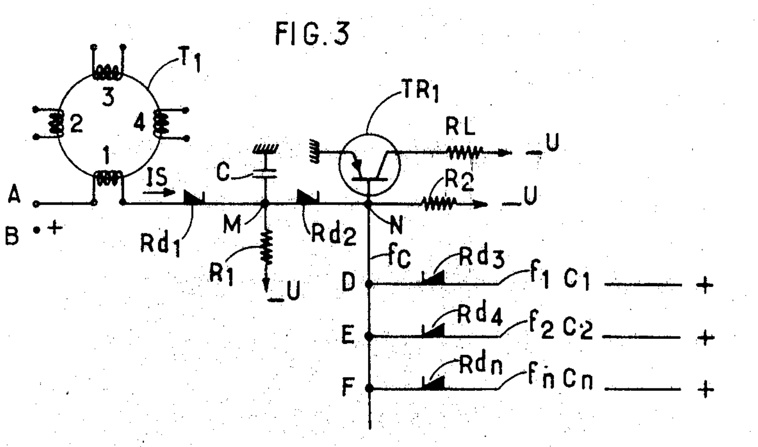
FIGURE 3 is a schematic diagram of a device according to the present invention.

In the embodiment of the present invention illustrated in FIGURE 3, the device comprises a core $T_1$ with windings 1, 2, 3, 4, etc., altogether comparable to the core $T_0$ of FIGURE 1. Winding 1 supplied with alternating current by a generator mounted between the terminals A and B is connected to a point M through a diode $R_{d1}$, the diode being oriented in a direction such that it is adapted to pass only the positive polarity portion of a waveform. Point M is connected also to point N at the base of a transistor $TR_1$ through a diode $R_{d2}$ oriented in the same direction as diode $R_{d1}$. Finally, point M is connected, on the one hand, to a negative polarity through a resistance $R_1$ and, on the other hand, to ground through a condenser C. The transistor $TR_1$ has the emitter thereof connected to ground, its collector being connected to the negative polarity side of direct current source U through a load resistance $R_L$, with the base thereof connected to a point N. Point N is also connected to the negative polarity side of source U through a resistance $R_2$ and to an input control line $f_C$ upon which there may be mounted in shunt at points D, E, F . . . one or several lines $f_1c_1$, $f_2c_2$, $f_3c_3$ . . . each comprising a diode $R_{d3}$, $R_{d4}$ . . . $R_{dn}$, respectively, through which there is applied positive control pulses which may or may not be of short duration.

Given this circuit arrangement, it is apparent that points M (output of the magnetic amplifier) and N (base of the transistor) are distinct and have the same potential only when the diode $R_{d2}$ is conducting. On the other hand, in FIGURE 1, in the relay of known configuration points M and N are both common with point Q. This peculiarity is very important.

Figure 4:
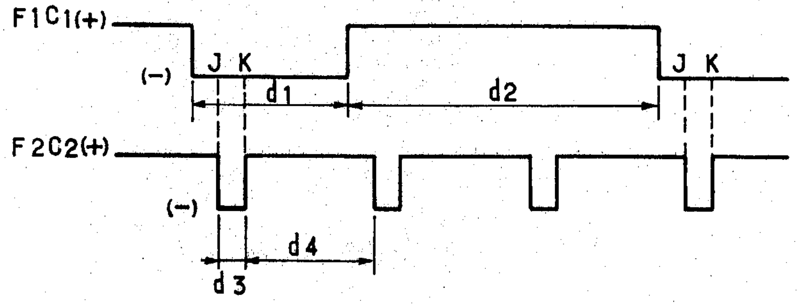
FIGURE 4 is a waveform diagram indicating by way of example how a sample command may be effected.

In FIGURE 4, by way of example, the curve $F_1C_1$ provides the waveform of the potentials at point N due to the single control line $f_1c_1$. Curve $F_2C_2$ provides in an analogous manner the waveform of the potentials at point N due to the single control line $f_2c_2$. It is assumed that there is only these two single controls for the transistor respectively applied through the diodes $R_{d3}$ and $R_{d4}$. If one considers only the single line $f_1c_1$, one sees that in one period of the waveform there is a portion $d_1$ of negative potential and a portion $d_2$ of positive potential. The part $d_2$ corresponds to a pulse through the diode $R_{d3}$, whereas part $d_1$ corresponds to the negative potential of point N if the transistor $TR_1$ is conducting. If one considers in an analogous fashion only the single line $f_2c_2$, one realizes that in one period of the waveform there is a portion $d_3$ of negative potential and a portion $d_4$ of positive potential.

However, the potential of point N is, in fact, determined by the superposition of the curves $f_1c_1$ and $f_2c_2$. Thus, it is noted that the potential of point N is always positive except for the portions J–K which are negative simultaneously on line $f_1c_1$ and on line $f_2c_2$. Therefore, the transistor $TR_1$ can be conductive only for the negative portions J–K; and is blocked during the rest of the time. The pulses $f_2c_2$ are provided at a frequency well higher than the frequency $f_1c_1$ but act, in fact, only at the frequency imposed by $f_1c_1$. The corresponding phase during J–K is called the sampling phase.

OPERATION

The diode $R_{d2}$ is assumed to be blocked; and the magnetic amplifier delivers only to the elements $R_1$ and C. According to the algebraic sum of the ampere turns being applied to the magnetic amplifier, the potential at point M will be either positive (with a value smaller than the positive polarity connected to point B), or negative.

As a matter of fact, the diode $R_{d2}$ may be blocked in the two following instances:

(1) If a positive potential is applied at point N through the diodes $R_{d3}$, $R_{d4}$ . . . $R_{dn}$ via the control lines $f_1c_1$, $f_2c_2$, $f_nc_n$ and $fc$. This positive potential of point N is always higher than the potential of point M, even if the latter is positive. It obviously blocks the transistor $TR_1$.

(2) If a negative potential is given to point M by the output current of the amplifier in the absence of the preceding control on the line *fc*. In this case, in fact, the transistor $TR_1$ is saturated by the current through $R_2$ and the potential of point N is very slightly negative. The potential of point M is negative with respect to that of N; and the transistor $TR_1$ is conducting.

Another phase of the operation is that where the diode $R_{d2}$ is passing. It corresponds to a positive potential at point M in the absence of a control on the line *fc*. The point N being connected now only to the resistance $R_2$, to the base of the transistor and to the diode $R_{d2}$, it will be assumed that it is at essentially the same positive potential as point M. This positive potential of point N maintains the transistor $TR_1$ in a blocked condition although a current is flowing through the resistance $R_2$.

Finally, if it is desired to draw from the transistor $TR_1$ an output intensity of great amplitude during a rather short period of time, one selects a resistance $R_2$ of low value which yields a strong base current. Consequently, the output current of the collector is equally high, the load resistance $R_L$ then having a much lower value.

During the sampling phase J–K (FIGURE 4), the transistor is blocked or saturated, according to whether the magnetic amplifier provides a positive or negative potential at point M.

If the potential at point M is negative ($R_{d2}$ being blocked), the transistor $TR_1$ is saturated and furnishes a current of great amplitude; if the potential at point M is positive ($R_{d2}$ being conductive), the transistor $TR_1$ remains blocked. As a matter of fact, the amplifier delivers a current to the resistances $R_1$ and $R_2$ in parallel from point M. The equivalent resistance of $R_1$ and $R_2$ being smaller than $R_1$, the potential of point M has the tendency to decrease and to become negative despite the affect of the storage capacity C which furnishes a compensating current. The time during which the potential of point M is kept positive is thus a function both of the capacity C and of the resistance $R_1$.

At a time other than that of the sampling phase J–K (see FIGURE 4), the potential of point M rises again slowly and reassumes its maximum positive value which will again initiate a new cycle identical to that which has been described above.

If an output of great amplitude is not desired at the output of the transistor $TR_1$, for example, if one does not desire an intensity higher than 200 milliamperes, the resistance $R_2$ can be made larger so that it is possible for the magnetic amplifier to maintain the potential of point M positive during the time desired. The sampling time is not subjected in this case to any condition other than that of the control of the amplifier.

In conclusion, the transistor $TR_1$ is kept blocked whatever be the condition of the magnetic amplifier by the rapid or semi-rapid commands placed on the diodes $R_{d3}$, $R_{d4}$ . . . $R_{dn}$; the disappearance of these commands constitutes the sampling phase during which $TR_1$ is conducting or blocked, according to the condition of the magnetostatic relay. The current pulse collected on the collector of $TR_1$ will correspond to the time of rise and fall of the commands placed on $R_{d3}$, $R_{d4}$, . . . $R_{dn}$. If an an increased current amplitude is desired, in the order of one ampere, it is necessary in that case that the sampling time be short (in the order of 20 microseconds, for example).

If a sampling current of great amplitude is desired, the duration of the pulse is a function of the resistance $R_1$ and of the capacity C.

The present invention is by no means restricted to the single embodiment described and illustrated herein which has been given only by way of example. More particularly, the foregoing specification has been given in the case of a transistor of the PNP type, but the same device may be obtained with a NPN transistor by means of a convenient adaptation of the polarities and of the orientation of the diodes.

I claim:

1. An AND circuit comprising:
magnetic amplifier means responsive to at least one control signal for controlling an alternating current output,
a transistor having base, emitter and collector electrodes,
diode means connecting said alternating current output of said magnetic amplifier means to the base electrode of said transistor, and
control means connecting at least a second control signal to the base electrode of said transistor for coordinate control thereof with said one control signal applied to said magnetic amplifier means.

2. The combination defined in claim 1 wherein said diode means includes two serially connected diodes poled in the same direction, a capacitor connecting the point of connection between said diodes to ground, and a resistor connecting said point of connection to a constant potential source.

3. The combination defined in claim 1 wherein said magnetic amplifier means includes at least two input control windings for receiving first and second input control signals.

4. The combination defined in claim 1 wherein said control means includes at least two control lines connected between the base electrode of said transistor and a source of constant potential through a circuit interrupter device.

5. A logical magnetostatic element comprising:
magnetic amplifier means including a magnetic core having at least one direct current control winding and one alternating current working winding,
a transistor having base, emitter and collector electrodes,
diode means including a pair of serially connected diodes connected between said working winding of said magnetic amplifier means and the base electrode of said transistor, said diodes being poled in the same direction, and
signal control means for applying control pulses to the base electrode of said transistor so that the transistor is controlled either by command from said magnetic amplifier means or by command from said signal control means.

6. The combination defined in claim 5 further including bias means for said diodes including a direct current bias voltage source and a resistance interconnecting the point of connection of said pair of diodes with said bias voltage source.

7. The combination defined in claim 6 further including cut-off control means for determining the level of control from said magnetic amplifier means necessary to cut-off said transistor including a capacitor connecting said point of connection of said pair of diodes to ground.

8. The combination defined in claim 7 wherein said pair of diodes are oriented to pass only the positive polarity portion of the alternating signals from the working winding of said magnetic amplifier means.

9. The combination defined in claim 7 wherein said signal control means includes at least two control lines connected between the base electrode of said transistor and a source of constant potential through a circuit interrupter device.

10. The combination defined in claim 9 wherein the emitter electrode of said transistor is connected to ground, the collector electrode is connected through a load resistance to said bias voltage source and the base electrode is connected through a bias resistance to said bias voltage source.

11. The combination defined in claim 9 wherein said bias voltage source is of negative polarity and said source of constant potential is of positive polarity and has an amplitude sufficient to block said transistor.

12. The combination defined in claim 9 wherein each said control line includes a diode in series with a circuit interrupter of unique operating frequency, the switching time of said transistor being determined by the lowest operating frequency of said interrupters.

13. An AND circuit comprising:

a transistor having a control electrode and an output electrode forming the output of said AND circuit, at least one first input terminal connected to said control electrode of said transistor for applying a control input signal thereto, and at least one second input terminal connected to a control winding disposed on a saturable core on which is also disposed a working winding having one end connected to an alternating current source and the other end connected to said control electrode of said transistor via a diode.

References Cited

UNITED STATES PATENTS

| | | | |
|---|---|---|---|
| 2,909,674 | 10/1959 | Moore et al. | 307—88 |
| 3,085,234 | 4/1963 | Monin | 307—88 XR |
| 3,176,144 | 3/1965 | Gunderson et al. | 307—88 |

BERNARD KONICK, Primary Examiner

G. M. HOFFMAN, Assistant Examiner